United States Patent
Park et al.

(10) Patent No.: US 10,965,169 B2
(45) Date of Patent: Mar. 30, 2021

(54) WIRELESS POWER TRANSMITTER

(71) Applicant: WITS Co., Ltd., Yongin-si (KR)

(72) Inventors: Seung Won Park, Suwon-si (KR); Eun Young Shin, Suwon-si (KR); Byoung Woo Ryu, Suwon-si (KR); Hyo Young Kim, Suwon-si (KR); Yun Ki Hong, Suwon-si (KR); Young Seung Roh, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 170 days.

(21) Appl. No.: 16/011,883

(22) Filed: Jun. 19, 2018

(65) Prior Publication Data
US 2019/0140484 A1 May 9, 2019

(30) Foreign Application Priority Data
Nov. 7, 2017 (KR) .................. 10-2017-0147182

(51) Int. Cl.
*H01F 27/42* (2006.01)
*H01F 37/00* (2006.01)
(Continued)

(52) U.S. Cl.
CPC .............. *H02J 50/40* (2016.02); *H02J 5/005* (2013.01); *H02J 50/12* (2016.02); *H02J 50/70* (2016.02); *H02J 7/025* (2013.01)

(58) Field of Classification Search
CPC .. H02J 50/12; H02J 50/70; H02J 5/005; H02J 50/40; H02J 7/025
See application file for complete search history.

(56) References Cited

U.S. PATENT DOCUMENTS

2008/0259646 A1* 10/2008 Moussaoui ....... H02M 3/33507
363/17
2009/0174263 A1* 7/2009 Baarman ................. H02J 50/12
307/104
(Continued)

FOREIGN PATENT DOCUMENTS

JP 2011-205767 A 10/2011
JP 2016-536951 A 11/2016
(Continued)

*Primary Examiner* — Rexford N Barnie
*Assistant Examiner* — Rasem Mourad
(74) *Attorney, Agent, or Firm* — Harness, Dickey & Pierce, P.L.C.

(57) ABSTRACT

A wireless power transmitter includes: a power supply configured to supply a driving power; a first power transmitter including first bridge switching elements forming a first bridge circuit, and configured to receive the driving power to transmit a first power, wherein a magnitude of a first input voltage applied to the first bridge circuit is determined by a duty of at least one of the first bridge switching elements; a second power transmitter including second bridge switching elements forming a second bridge circuit, and configured to receive the driving power to transmit a second power, wherein a magnitude of a second input voltage applied to the second bridge circuit is determined by a duty of at least one of the second bridge switching elements; and a controller configured to output first and second power transmitting control signals respectively controlling the first bridge switching elements and the second bridge switching elements.

15 Claims, 9 Drawing Sheets

(51) Int. Cl.
*H01F 38/00* (2006.01)
*H02J 50/40* (2016.01)
*H02J 50/12* (2016.01)
*H02J 5/00* (2016.01)
*H02J 50/70* (2016.01)
*H02J 7/02* (2016.01)

(56) References Cited

U.S. PATENT DOCUMENTS

| 2013/0147280 | A1* | 6/2013 | Oettinger | H02J 7/025 |
| | | | | 307/104 |
| 2015/0188358 | A1* | 7/2015 | Jeong | H02J 7/025 |
| | | | | 320/108 |
| 2016/0079792 | A1* | 3/2016 | Jeong | H02J 7/025 |
| | | | | 455/573 |
| 2016/0111888 | A1* | 4/2016 | Cho | H02J 50/10 |
| | | | | 307/104 |
| 2017/0271923 | A1 | 9/2017 | Kim et al. | |
| 2018/0301934 | A1* | 10/2018 | Prabhala | H02J 50/40 |
| 2019/0006889 | A1* | 1/2019 | Iwasaki | H02J 50/05 |

FOREIGN PATENT DOCUMENTS

| KR | 10-2017-0107344 A | 9/2017 |
| WO | WO 2015/037690 A1 | 3/2015 |

* cited by examiner

WIRELESS POWER TRANSMITTER

CROSS-REFERENCE TO RELATED APPLICATIONS

This application claims benefit under 35 U.S.C. § 119(a) of Korean Patent Application No. 10-2017-0147182 filed on Nov. 7, 2017 in the Korean Intellectual Property Office, the entire disclosure of which is incorporated herein by reference for all purposes.

BACKGROUND

1. Field

The following description relates to a wireless power transmitter that transmits power wirelessly.

2. Description of Related Art

Many mobile devices capable of wireless charging have recently been released. Such mobile devices use different amounts of power depending on the purpose of usage or a size of the mobile devices. Accordingly, magnitudes of power which mobile devices receive wirelessly are different. For example, when comparing a smartphone with a wearable device, the magnitude of power for wirelessly charging the smartphone is greater than the magnitude of power for wirelessly charging the wearable device.

In addition, as regulations for transmission frequencies have recently been tightened, the range of frequencies available for wireless charging is gradually being reduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmitter includes: a power supply configured to supply a driving power; a first power transmitter including first bridge switching elements forming a first bridge circuit, and configured to receive the driving power to transmit a first power, wherein a magnitude of a first input voltage applied to the first bridge circuit is determined by a duty of at least one of the first bridge switching elements; a second power transmitter including second bridge switching elements forming a second bridge circuit, and configured to receive the driving power to transmit a second power, wherein a magnitude of a second input voltage applied to the second bridge circuit is determined by a duty of at least one of the second bridge switching elements; and a controller configured to output first power transmitting control signals controlling the first bridge switching elements and second power transmitting control signals controlling the second bridge switching elements.

The first bridge circuit may be a full-bridge circuit, and the second bridge circuit may be a half-bridge circuit.

The controller may be an integrated circuit.

Frequencies of the first power transmitting control signals may be the same as frequencies of the second power transmitting control signals.

The controller may be configured to determine the frequencies of the first power transmitting control signals based on first error information, and determine the frequencies of the second power transmitting control signals according to the frequencies of the first power transmitting control signals.

In another general aspect, a wireless power transmitter includes: a power supply configured to supply a driving power; a first power transmitter including first bridge switching elements forming a first bridge circuit, and configured to receive the driving power to transmit a first power, wherein a magnitude of a first input voltage applied to the first bridge circuit is determined by a duty of at least one first bridge switching element among the first bridge switching elements; a second power transmitter including second bridge switching elements forming a second bridge circuit, and configured to receive the first input voltage to transmit a second power; and a controller configured to output first power transmitting control signals controlling the first bridge switching elements and second power transmitting control signals controlling the second bridge switching elements.

The first bridge circuit may be a full-bridge circuit, and the second bridge circuit may be a half-bridge circuit.

Frequencies of the first power transmitting control signals may be the same as frequencies of the second power transmitting control signals.

In another general aspect, a wireless power transmitter includes: a first power transmitter including first bridge switching elements forming a first bridge circuit, and configured to wirelessly transmit a first power; a second power transmitter including second bridge switching elements forming a second bridge circuit, and configured to wirelessly transmit a second power; and a controller configured to determine a first operation frequency and a first operation duty based on first error information, generate and output first power transmitting control signals controlling the first bridge switching elements, based on the first operation frequency and the first operation duty, determine a second operation duty based on second error information, and generate and output second power transmitting control signals controlling the second bridge switching elements, based on the first operation frequency and the second operation duty.

The first bridge circuit may be a full-bridge circuit, and the second bridge circuit may be a half-bridge circuit.

The controller may be configured to output the first power transmitting control signals to cause the first bridge circuit to operate as a full-bridge inverter, in response to a power required by a first wireless power receiver receiving the power from the first power transmitter being higher than reference power. The controller may be configured to output the first power transmitting control signals to cause the first bridge circuit to operate as a half-bridge inverter, in response to the power required by the first wireless power receiver being lower than the reference power.

The controller may be configured to set the first operation duty to a reference duty having a fixed value and varies the first operation frequency based on the first error information, in response to a power required by a first wireless power receiver receiving the power from the first power transmitter being higher than reference power. The controller may be configured to set the first operation frequency as a reference frequency having a fixed value and vary the first operation duty based on the first error information, in response to the power required by the first wireless power being lower than the reference power.

The controller may be configured to vary either one or both of the first operation frequency and the first operation duty based on the first error information, in response to a power required by a first wireless power receiver receiving the power from the first power transmitter being higher than reference power. The controller may be configured to vary an inverter duty of the first bridge circuit based on the first error information, in response to the power required by the first wireless power receiver being lower than the reference power.

A magnitude of a first input voltage input to the first bridge circuit may be determined by the first operation duty.

A magnitude of a second input voltage input to the second bridge circuit may be determined by the second operation duty.

The first input voltage may be input to the second bridge circuit.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
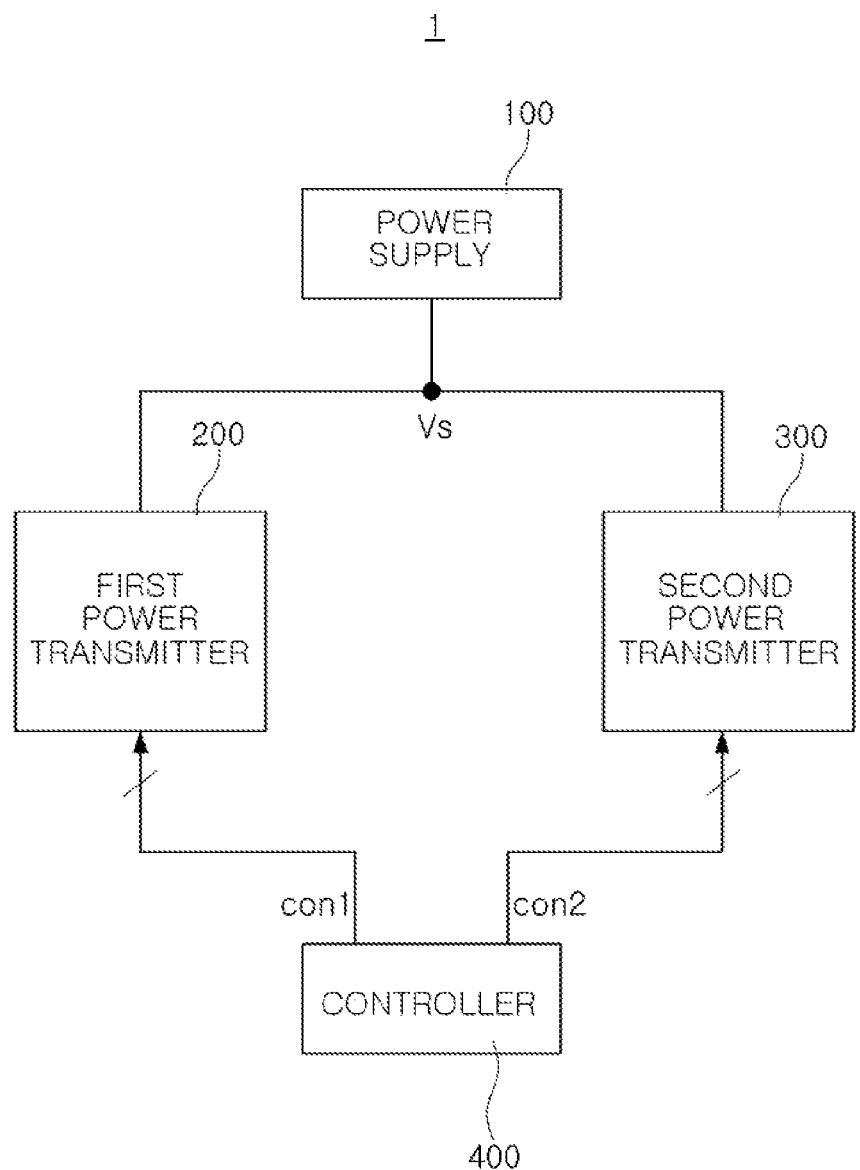
FIG. 1 is a schematic block diagram illustrating a configuration of a wireless power transmitter, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a schematic block diagram illustrating a configuration of a wireless power transmitter 1, according to an embodiment. The wireless power transmitter 1 includes, for example, a power supply 100, a first power transmitter 200, a second power transmitter 300, and a controller 400.

The power supply 100 may supply a driving power Vs. The driving power Vs may be a direct current (DC) voltage. In this case, the power supply 100 may convert alternating current (AC) power input from the outside into DC power, and may output the converted DC power as the driving power Vs. In this case, the power supply 100 may further include a converter that converts a magnitude of the DC power.

The first power transmitter 200 may input the driving power Vs, and may wirelessly transmit power to a first wireless power receiver (not shown) in response to a first power transmitting control signal con1.

The second power transmitter 300 may input the driving power Vs, and may wirelessly transmit power to a second wireless power receiver (not shown) in response to a second power transmitting control signal con2.

The power transmitted by the first power transmitter 200 may be greater than the power transmitted by the second power transmitter 300. In this case, the first power transmitter 200 may include a full-bridge inverter, and the second power transmitter 300 may include a half-bridge inverter. In addition, in this case, the first wireless power receiver may be a mobile terminal such as a smartphone or the like, and the second wireless power receiver may be a wearable device.

The controller 400 may output the first power transmitting control signal con1 and the second power transmitting control signal con2. The first power transmitting control signal con1 may include control signals for controlling switching elements of an inverter of the first power transmitter 200, and the second power transmitting control signal con2 may include control signals for controlling switching elements of an inverter of the second power transmitter 300. The controller 400 may control a wireless charging operation performed by the first power transmitter 200 by adjusting a frequency, a duty, and/or a timing (or a phase difference) of each of the control signals composing the first power transmitting control signal con1. In addition, the controller 400 may control a wireless charging operation performed by the second power transmitter 300 by adjusting a frequency and/or a duty of each of the control signals composing the second power transmitting control signal con2. Frequencies of the control signals composing the second power transmitting control signal con2 may be determined by frequencies of the control signals composing the first power transmitting control signal con1.

The controller 400 may be implemented as an integrated circuit. The first power transmitter 200 and the second power transmitter 300 may be controlled by one controller 400 implemented as an integrated circuit, such that cost for manufacturing the wireless power transmitter may be reduced.

In addition, the controller 400 may include at least one processing unit or processor. According to an exemplary embodiment, the controller 400 may further include a memory. The processor may include, for example, a central processing unit (CPU), a graphic processing unit (GPU), a microprocessor, an application specific integrated circuit (ASIC), field programmable gate arrays (FPGA), and the like, and may have a plurality of cores. The memory may be a volatile memory (e.g., a random access memory (RAM), or the like), a non-volatile memory (e.g., a read only memory (ROM), a flash memory, or the like), or a combination thereof. The memory may store a program created to perform a wireless power transmission method according to an embodiment.

The controller 400 may include a gate driver. Alternatively, according to an embodiment, the wireless power transmitter 1 may separately include a gate driver for driving switches included in the first power transmitter 200 and/or the second power transmitter 300 according to the control signal provided from the controller.

Figure 2:
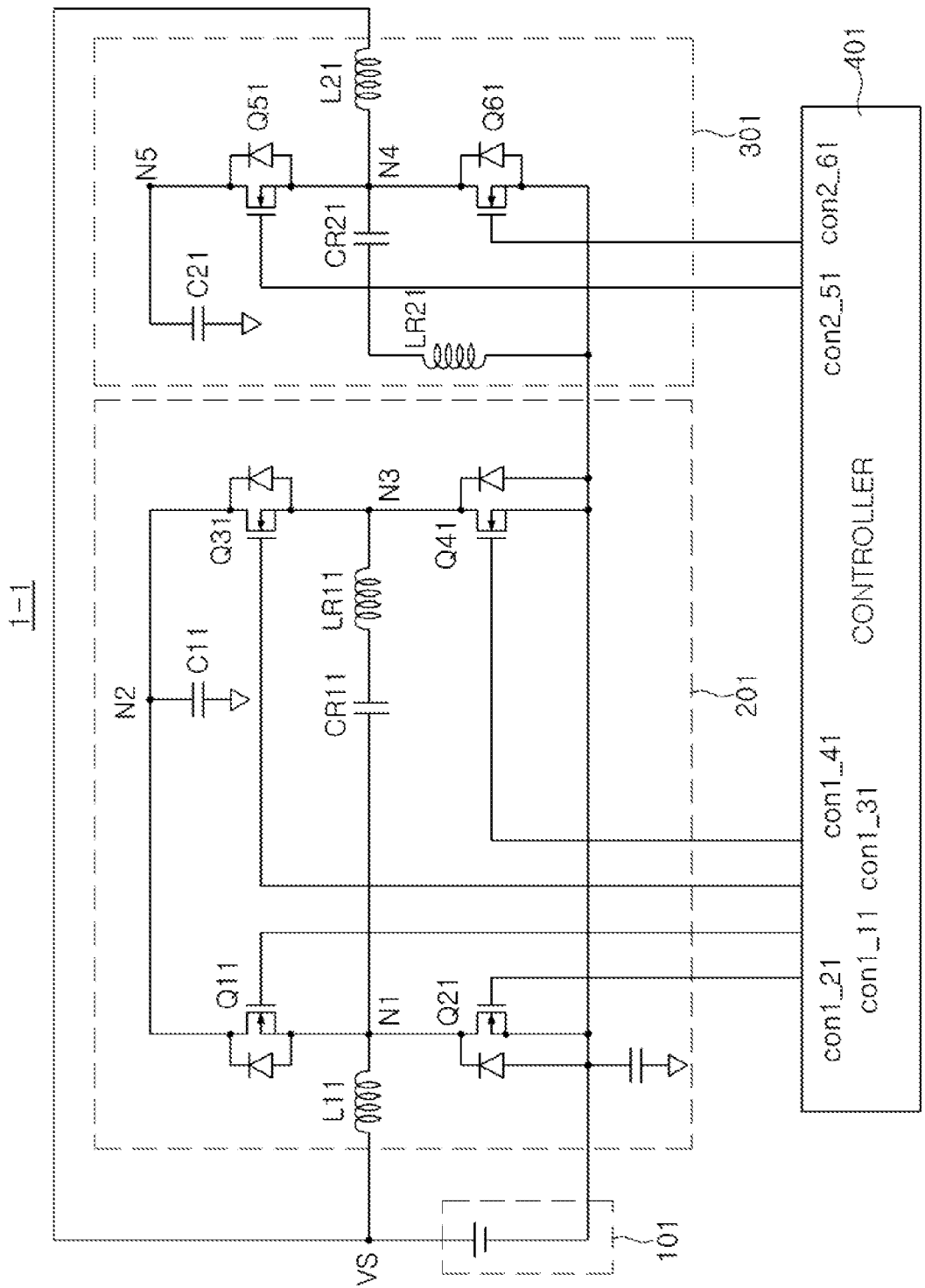
FIG. 2 is a schematic circuit diagram illustrating a configuration of a wireless power transmitter, according to an embodiment.

FIG. 2 is a schematic circuit diagram illustrating a configuration of a wireless power transmitter 1-1, according to an embodiment. The wireless power transmitter 1-1 may include a power supply 101, a first power transmitter 201, a second power transmitter 301, and a controller 401.

The power supply 101 may supply driving power Vs. The power supply 101 may be the same as the power supply 100 illustrated in FIG. 1.

The first power transmitter 201 may include a first inductor L11 connected between a node to which the driving power Vs is applied and a first node N1, a first capacitor C11 connected between a second node N2 and a ground, a first switching element Q11 connected between the first node N1 and the second node N2, and operating in response to a first control signal con1_11, a second switching element Q21 connected between the first node N1 and the ground, and operating in response to a second control signal con1_21, a third switching element Q31 connected between the second node N2 and a third node N3, and operating in response to a third control signal con1_31, a fourth switching element Q41 connected between the third node N3 and the ground, and operating in response to a fourth control signal con1_41, and a first resonance capacitor CR11 and a first resonance inductor LR11 which are connected in series with each other between the first node N1 and the third node N3.

The first inductor L11, the first capacitor C11, the first switching element Q11, the second switching element Q21, the third switching element Q31, and the fourth switching element Q41 of the first power transmitter 201 may constitute a first converter that converts the driving power Vs into a first AC power and outputs the first AC power. In the first converter, the first inductor L11, the first capacitor C11, the first switching element Q11, and the second switching element Q21 may operate as a boost converter that steps-up the driving power Vs to a first inverter input voltage (i.e., a voltage of the second node N2), and the first switching element Q11, the second switching element Q21, the third switching element Q31, and the fourth switching element Q41 may operate as a full-bridge inverter that converts the first inverter input voltage into the first AC power. That is, the first converter may include a step-up inverter having a form in which the boost converter and the inverter are coupled to each other.

The first resonance capacitor CR11 and the first resonance inductor LR11 of the first power transmitter 201 may constitute a first resonator that is supplied with the first AC power and wirelessly transmits a first power.

A time at which the first AC power is applied to a first resonator may be determined by on/off timings of the switching elements Q11, Q21, Q31, and Q41. That is, in a case in which both of the first switching element Q11 and the fourth switching element Q41 are in an on-state, or both of the second switching element Q21 and the third switching element Q31 are in the on-state, the first AC power may be applied to the first resonator. An inverter duty determining a time at which the first AC power is applied to the first resonator may be defined as a ratio of a sum of a first time in which both of the first switching element Q11 and the fourth switching element Q41 are in the on-state and a second time in which both of the second switching element Q21 and the third switching element Q31 are in the on-state to operation periods of the switching elements Q11, Q21, Q31, and Q41.

In a case in which a phase control is not performed, a first AC power (Vinv1($t$)), that is, a voltage between the first node N1 and the third node N3 may be determined as in Equation 1, below.

$$V\text{int }1(t) = 4(Vs/(1-D))\sin(wt/\pi) \qquad [\text{Equation 1}]$$

In Equation 1, Vs is voltage magnitude of the driving power input from the power supply 101, D is an operation duty and a duty of the control signal con1_21, and w is a frequency of each of the control signals con1_11, con1_21, con1_31, and con1_41.

The second power transmitter 301 may include a second inductor L21 connected between a node to which the driving power Vs is applied and a fourth node N4, a second capacitor C21 connected between a fifth node N5 and a ground, a fifth switching element Q51 connected between the fourth node N4 and the fifth node N5, and operating in response to a fifth control signal con2_51, a sixth switching element Q61 connected between the fourth node N4 and the ground, and operating in response to a sixth control signal con2_61, and a second resonance capacitor CR21 and a second resonance inductor LR21, which are connected in series with each other between the fourth node N4 and the ground.

The second inductor L21, the second capacitor C21, the fifth switching element Q51, and the sixth switching element Q61 of the second power transmitter 301 may constitute a second converter that converts the driving power Vs into a second AC power and outputs the second AC power. In the second converter, the second inductor L21, the second capacitor C21, the fifth switching element Q51, and the sixth switching element Q61 may operate as a boost converter that steps-up the driving power Vs to a second inverter input voltage (i.e., a voltage of the fifth node N5), and the fifth switching element Q51 and the sixth switching element Q61 may operate as a half-bridge inverter that converts the second inverter input voltage into the second AC power. The second resonance capacitor CR21 and the second resonance inductor LR21 of the second power transmitter 301 may constitute a second resonator that is supplied with the second AC power and wirelessly transmits a second power.

A magnitude of a second inverter input voltage V_N5 may be determined by Equation 2, below.

$$V\_N5 = V/(1-D) \quad \text{[Equation 2]}$$

In Equation 2, Vs is voltage magnitude of the driving power input from the power supply 101, and D is an operation duty and an ON-duty of the sixth control signal con2_61.

In addition, a voltage (vinv2(t)) of the second AC power may be determined by Equation 3, below.

$$V\text{int }2(t) = 2(Vs/(1-D))\sin(wt/\pi) \quad \text{[Equation 3]}$$

In Equation 3, w is a frequency of each of the control signals con2_51 and con2_61.

According to an embodiment, the magnitude of the power transmitted by the second power transmitter 301 may be controlled by adjusting the ON-duty of the sixth control signal con2_61 even if the frequency of each of the control signals con2_51 and con2_61 is fixed.

The second resonance capacitor CR21 and the second resonance inductor LR21 of the second power transmitter 301 may constitute a second resonator that is supplied with the second AC power and wirelessly transmits a second power.

The controller 401 may output the first control signal con1_11, the second control signal con1_21, the third control signal con1_31, the fourth control signal con1_41, the fifth control signal con1_51, and the sixth control signal con1_61. The controller 401 may adjust the first power transmitted by the first power transmitter 201 by adjusting a frequency, a duty, a timing, and/or a phase difference of each of the first control signal con1_11, the second control signal con1_21, the third control signal con1_31, an the fourth control signal con1_41. In addition, the controller 401 may adjust the second power transmitted by the second power transmitter 301 by adjusting a frequency, a duty, a timing, and/or a phase difference of each of the fifth control signal con1_51 and the sixth control signal con1_61. The frequency of each of the fifth control signal con1_51 and the sixth control signal con1_61 may be determined according to the frequency of each of the first control signal con1_11, the second control signal con1_21, the third control signal con1_31, an the fourth control signal con1_41. The controller 401 may output the control signals based on a difference between power required by the wireless power receiver and power received by the wireless power receiver. The controller 401 may be implemented as an integrated circuit. Thereby, a cost for manufacturing the wireless power transmitter 1-1 may be reduced.

In addition, the second node N2 and the fifth node N5 may be electrically isolated. That is, the first inverter input voltage (i.e., a voltage of the second node N2) and the second inverter input voltage (i.e., a voltage of the fifth node N5) may not affect each other. Thereby, the first power transmitter 201 and the second power transmitter 301 may be separately controlled. Therefore, both the first power transmitter 201 and the second power transmitter 301 may wirelessly transmit the power at an optimum efficiency.

Figure 3:
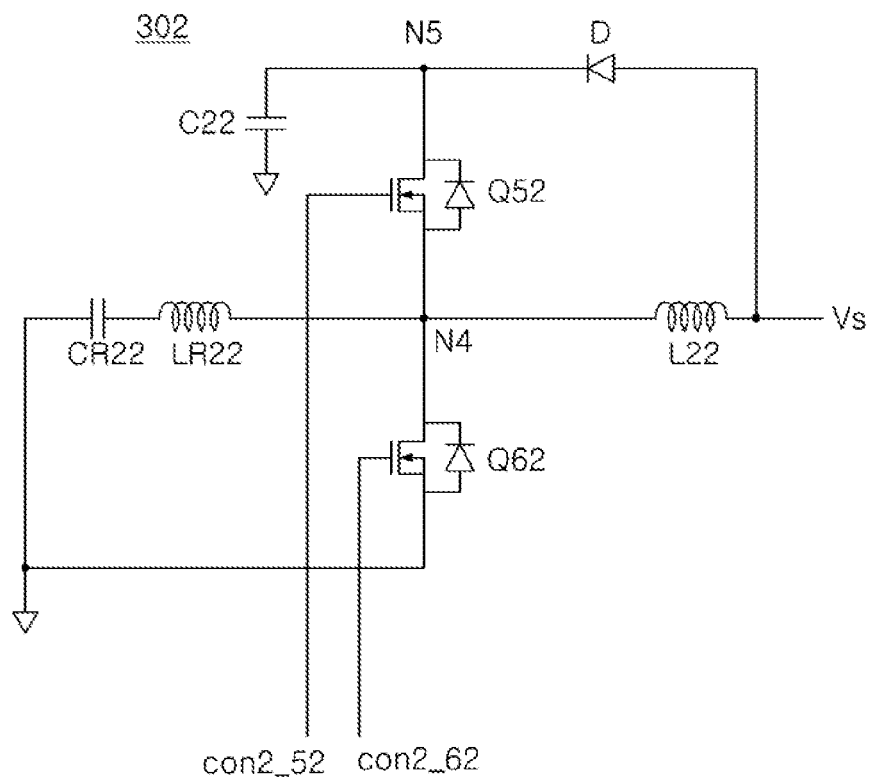
FIGS. 3 and 4 are schematic circuit diagrams illustrating a configuration of a second power transmitter of a wireless power transmitter, according to an embodiment.

FIG. 3 is a schematic circuit diagram illustrating a configuration of a second power transmitter 302 of a wireless power transmitter, according to an embodiment.

The second power transmitter 302 may include a second inductor L22 connected between a node to which the driving power Vs is applied and a fourth node N4, a second capacitor C22 between connected a fifth node N5 and a ground, a diode D connected between the node to which the driving power Vs is applied and the fifth node N5, a fifth switching element Q52 connected between the fourth node N4 and the fifth node N5, and operating in response to a fifth control signal con2_52, a sixth switching element Q62 connected between the fourth node N4 and the ground, and operating in response to a sixth control signal con2_62, and a second resonance capacitor CR22 and a second resonance inductor LR22, which are connected in series with each other between the fourth node N4 and the ground.

The control signals con2_52 and con2_62 may be output by the controller 401 (FIG. 2).

The second inductor L22, the second capacitor C22, the fifth switching element Q52, and the sixth switching element Q62 of the second power transmitter 302 may constitute a second converter that converts the driving power Vs into a second AC power and outputs the second AC power. In the second converter, the second inductor L22, the second capacitor C22, the fifth switching element Q52, and the sixth switching element Q62 may operate as a boost converter that steps-up the driving power Vs to a second inverter input voltage (i.e., a voltage of the fifth node N5), and the fifth switching element Q52 and the sixth switching element Q62 may operate as a half-bridge inverter that converts the second inverter input voltage into the second AC power.

The second power transmitter 302 illustrated in FIG. 3 may prevent ripples caused by complementary switching operations of the fifth switching element Q52 and the sixth switching element Q62 by including the diode D that prevents a reverse current flowing from the fifth node N5 to the node to which the driving power Vs is applied.

Figure 4:
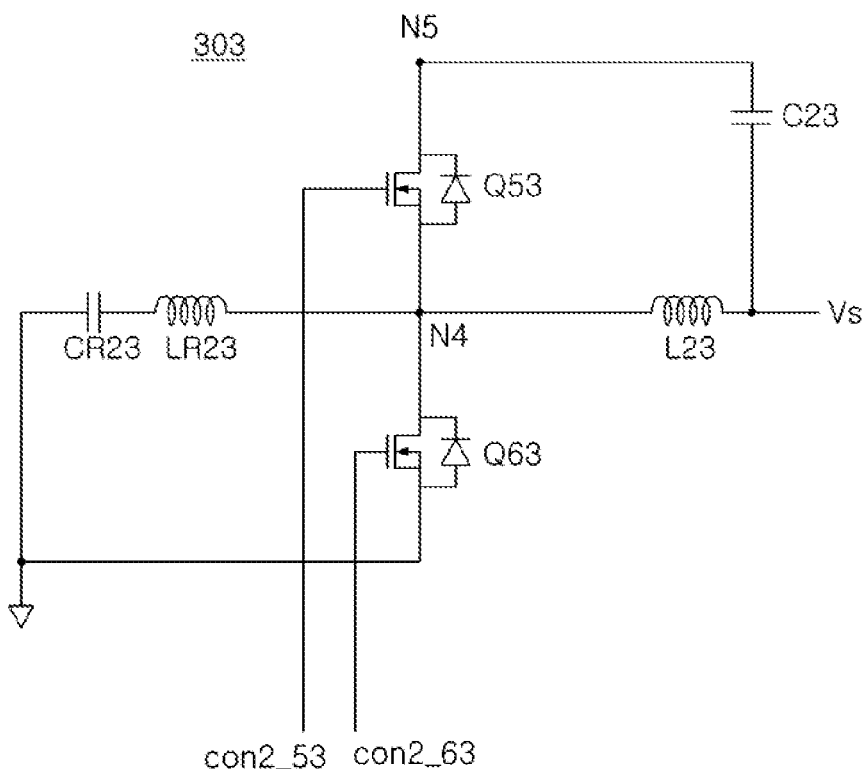

FIG. 4 is a schematic circuit diagram illustrating a second power transmitter 303 of a wireless power transmitter, according to an embodiment.

The second power transmitter 303 may include a second inductor L23 connected between a node to which the driving power Vs is applied and a fourth node N4, a second capacitor C23 between connected the node to which the driving power Vs is applied and a fifth node N5, a fifth switching element Q53 connected the fourth node N4 and the fifth node N5, and operating in response to a fifth control signal con2_53, a sixth switching element Q63 connected between the fourth node N4 and a ground, and operating in response to a sixth control signal con2_63, and a second resonance capacitor CR23 and a second resonance inductor LR23, which are connected in series with each other between the fourth node N4 and the ground.

The control signals con2_53 and con2_63 may be output by the controller 401 (FIG. 2).

The second inductor L23, the second capacitor C23, the fifth switching element Q53, and the sixth switching element Q63 of the second power transmitter 303 may constitute a second converter that converts the driving power Vs into a second AC power and outputs the second AC power. In the second converter, the second inductor L23, the second capacitor C23, the fifth switching element Q53, and the sixth switching element Q63 may operate as a boost converter that steps-up the driving power Vs to a second inverter input voltage (i.e., a voltage of the fifth node N5), and the fifth switching element Q53 and the sixth switching element Q63 may operate as a half-bridge inverter that converts the second inverter input voltage into the second AC power.

The second power transmitter 303 illustrated in FIG. 4 may improve initial operation performance by causing an initial voltage of the second capacitor C23 to become an input voltage. In addition, the second power transmitter 303 may also prevent a ripple which may be caused at the time of step-up by an alternative operation of the switching elements Q53 and Q63.

Figure 5:
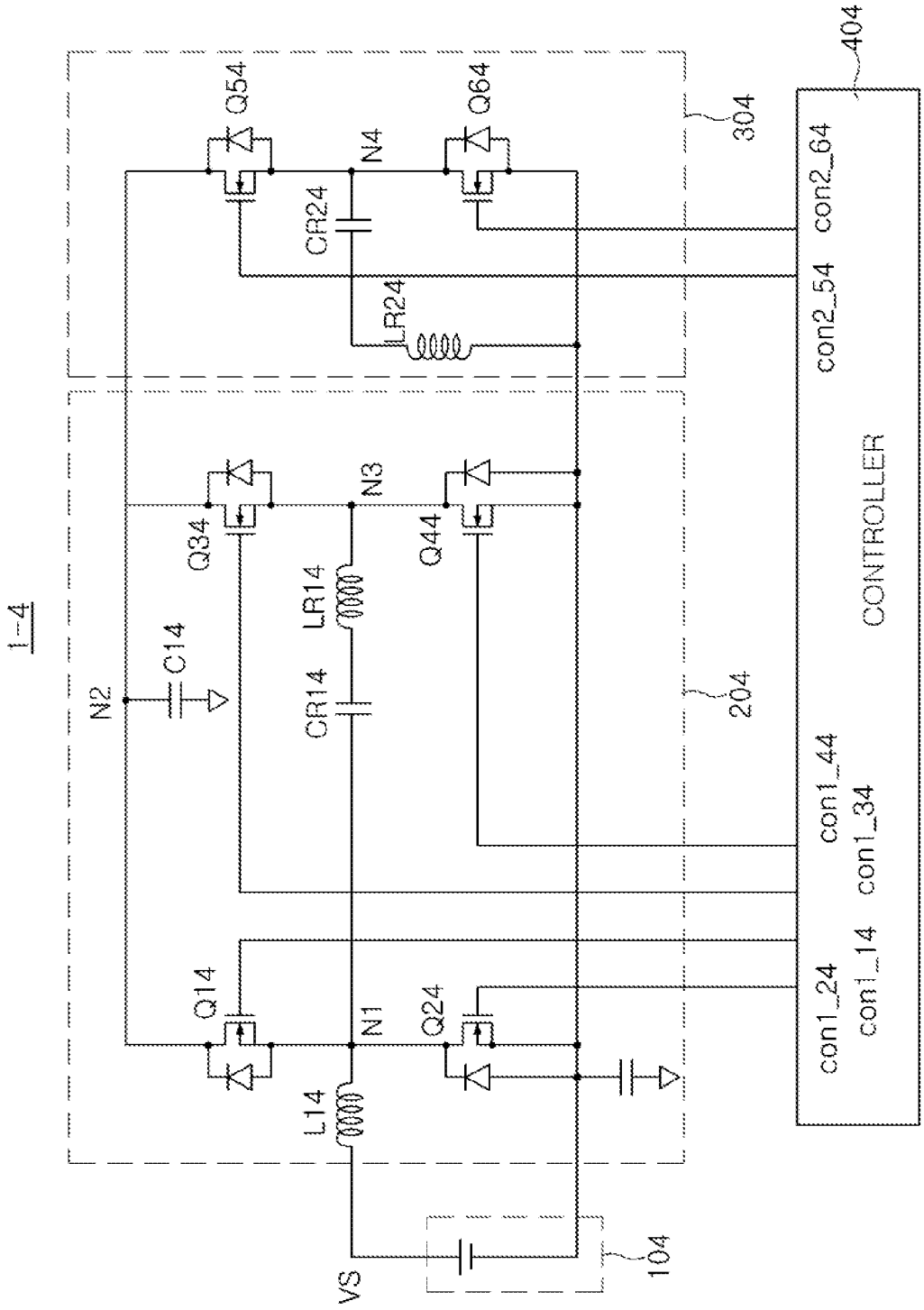
FIGS. 5 and 6 are schematic circuit diagrams illustrating a configuration of a wireless power transmitter, according to an embodiment.

FIG. 5 is a schematic circuit diagram illustrating a configuration of a wireless power transmitter 1-4, according to an embodiment. The wireless power transmitter 1-4 may include a power supply 104, a first power transmitter 204, a second power transmitter 304, and a controller 404.

The power supply 104 may supply the driving power Vs. The power supply 104 may be the same as the power supply 100 illustrated in FIG. 1.

The first power transmitter 204 may include a first inductor L14 connected between a node to which the driving power Vs is applied and a first node N1, a first capacitor C14 connected between a second node N2 and a ground, a first switching element Q14 connected between the first node N1 and the second node N2, and operating in response to a first control signal con1_14, a second switching element Q24 connected between the first node N1 and the ground, and operating in response to a second control signal con1_24, a third switching element Q34 connected between the second node N2 and a third node N3, and operating in response to a third control signal con1_34, a fourth switching element Q44 connected between the third node N3 and the ground, and operating in response to a fourth control signal con1_44, and a first resonance capacitor CR14 and a first resonance inductor LR14, which are connected in series with each other between the first node N1 and the third node N3.

The first power transmitter 204 of FIG. 5 may operate in the same way as the first power transmitter 201 of FIG. 2.

The second power transmitter 304 may include a fifth switching element Q54 connected between the second node N2 and a fourth node N4, and operating in response to a fifth control signal con2_54, a sixth switching element Q64 connected between the fourth node N4 and the ground, and operating in response to a sixth control signal con2_64, and a second resonance capacitor CR24 and a second resonance inductor LR24, which are connected in series with each other between the fourth node N4 and the ground.

The fifth switching element Q54 and the sixth switching element Q64 of the second power transmitter 304 may constitute a second converter that converts a voltage of the second node N2, that is, a first inverter input voltage generated by the first power transmitter 204 into a second AC power, and outputs the second AC power. The second resonance capacitor CR24 and the second resonance inductor LR24 of the second power transmitter 304 may constitute a second resonator that is supplied with the second AC power and wirelessly transmits a second power.

The controller 404 may output the first control signal con1_14, the second control signal con1_24, the third control signal con1_34, the fourth control signal con1_44, the fifth control signal con1_54, and the sixth control signal con1_64. An operation of the controller 404 may be similar to the controller 400 of FIG. 1 and the controller 401 of FIG. 2.

Figure 6:
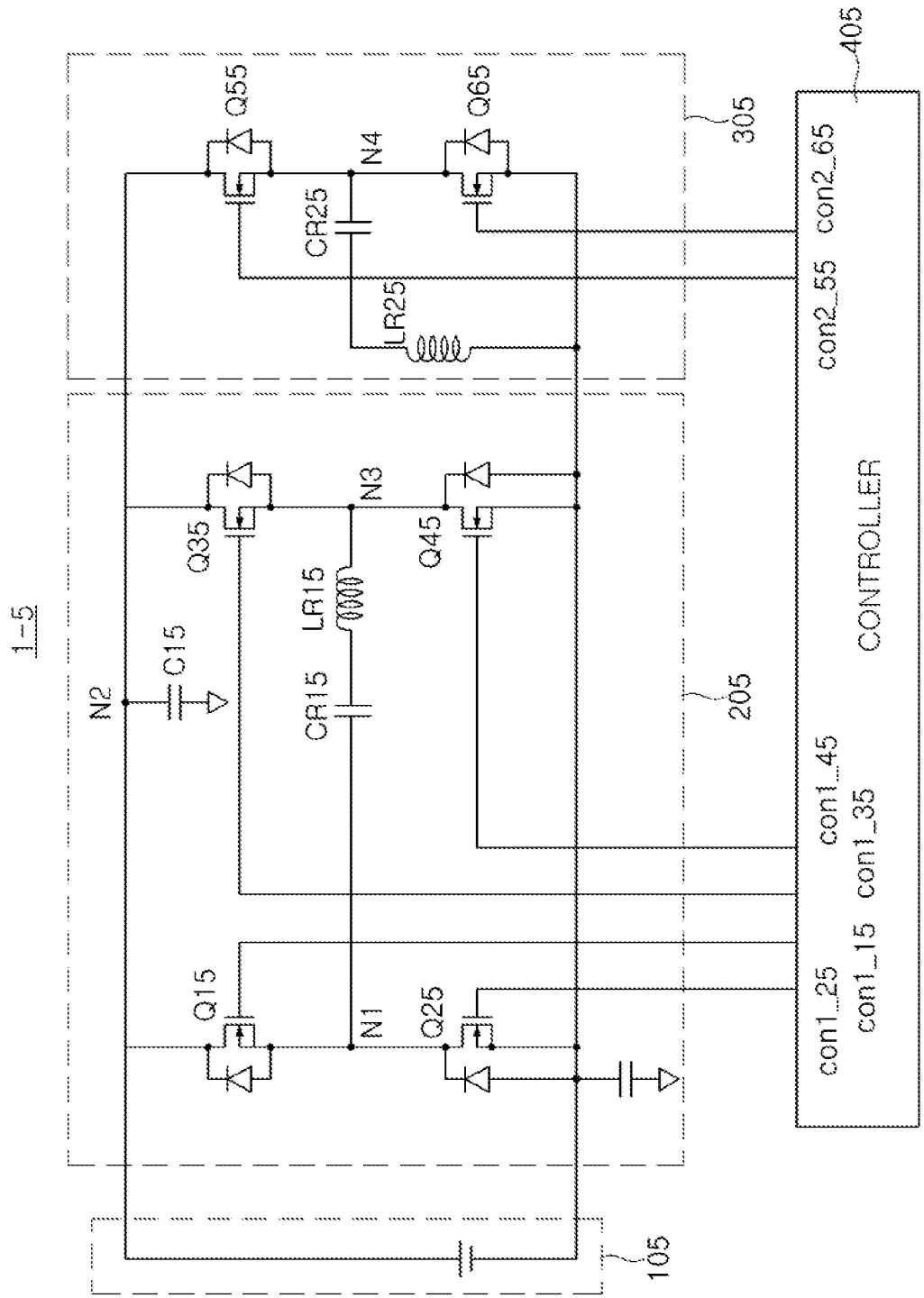

FIG. 6 is a schematic circuit diagram illustrating a configuration of a wireless power transmitter 1-5, according to an embodiment. The wireless power transmitter 1-5 may include a power supply 105, a first power transmitter 205, a second power transmitter 305, and a controller 405.

The power supply 105 may supply driving power Vs. The power supply 105 may be the same as the power supply 100 illustrated in FIG. 1.

The first power transmitter 205 may include a first capacitor C15 connected between a second node N2 to which the driving power Vs is applied and a ground, a first switching element Q15 connected between the first node N1 and the second node N2, and operating in response to a first control signal con1_15, a second switching element Q25 connected between the first node N1 and the ground, and operating in response to a second control signal con1_25, a third switching element Q35 connected between the second node N2 and a third node N3, and operating in response to a third control signal con1_35, a fourth switching element Q45 connected between the third node N3 and the ground, and operating in response to a fourth control signal con1_45, and a first resonance capacitor CR15 and a first resonance inductor LR15, which are connected in series with each other between the first node N1 and the third node N3.

The first capacitor C15, the first switching element Q15, the second switching element Q25, the third switching element Q35, and the fourth switching element Q45 of the first power transmitter 205 may constitute a first converter that converts the driving power Vs into a first AC power and outputs the first AC power. In the first converter, the first switching element Q15, the second switching element Q25, the third switching element Q35, and the fourth switching element Q45 may operate as a full-bridge inverter that converts the first inverter input voltage into the first AC power. The first resonance capacitor CR15 and the first resonance inductor LR15 of the first power transmitter 205 may constitute a first resonator that is supplied with the first AC power and wirelessly transmits a first power.

The second power transmitter 305 may include a fifth switching element Q55 connected between the second node N2 and a fourth node N4 and operating in response to a fifth control signal con2_55, a sixth switching element Q65 connected between the fourth node N4 and the ground and operating in response to a sixth control signal con2_65, and a second resonance capacitor CR25 and a second resonance inductor LR25 which are connected in series with each other between the fourth node N4 and the ground.

The fifth switching element Q55 and the sixth switching element Q65 of the second power transmitter 305 may configure a second converter that converts a voltage of the second node N2 into a second AC power and output the second AC power. The second resonance capacitor CR25 and the second resonance inductor LR25 of the second power transmitter 304 may configure a second resonator that is supplied with the second AC power and wirelessly transmits a second power.

The controller 405 may output the first control signal con1_15, the second control signal con1_25, the third control signal con1_35, the fourth control signal con1_45, the fifth control signal con2_55, and the sixth control signal con2_65. An operation of the controller 405 may be similar to the controller 400 of FIG. 1 and the controller 401 of FIG. 2.

Figure 7:
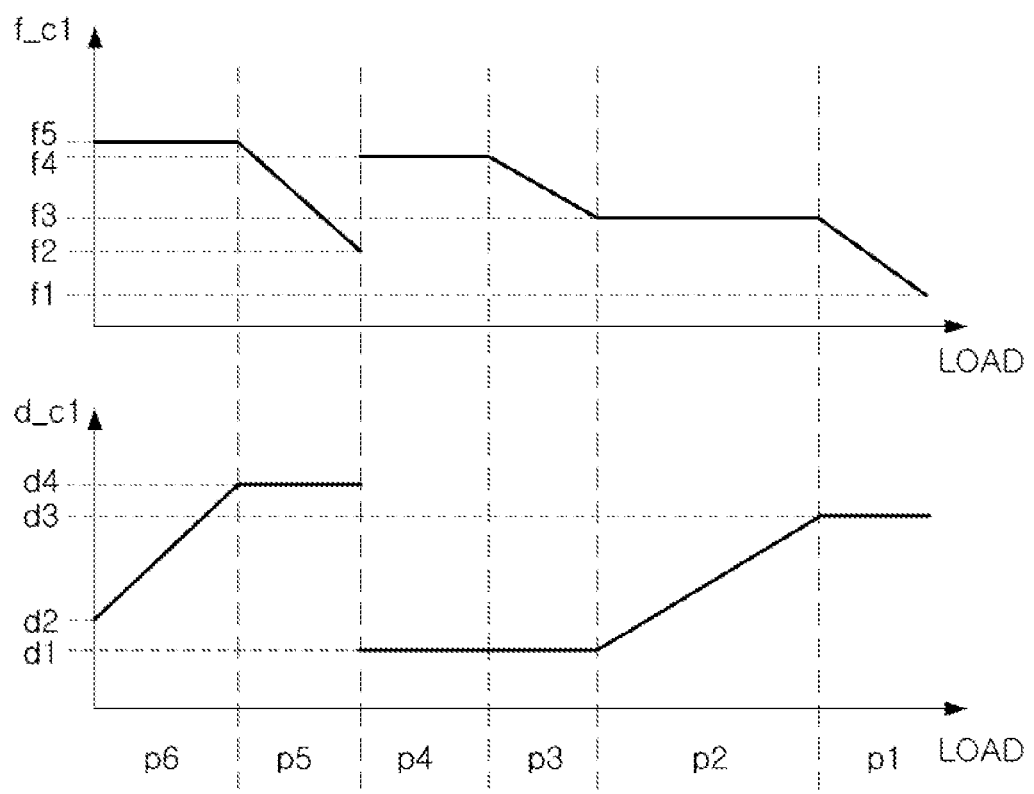
FIGS. 7 and 8 are diagrams illustrating a method for controlling a first power transmitter of a wireless power transmitter, according to an embodiment.

FIG. 7 is a diagram illustrating a method for controlling a first power transmitter of a wireless power transmitter, according to an embodiment. More specifically, FIG. 7 illustrates a control method of a case in which the first power transmitter transmits power to be supplied to a load (e.g., a battery) of a wireless power receiver.

In FIG. 7, f_c1 is a first operation frequency, which is a frequency of each of control signals controlling the switching elements composing the first power transmitter (200 in FIG. 1, 201 in FIG. 2, 204 in FIG. 5, and 205 in FIG. 6), d_c1 is a first operation duty, which is an ON duty of a control signal controlling a low side switching element (i.e., Q21 in FIG. 2 and Q24 in FIG. 5) of the booster converter among components of the first power transmitter, and a load is power required by the wireless power receiver or power to be output by the wireless power transmitter.

Referring to FIG. 7, in a first section p1 in which the load is relatively large, the controller may fix the first operation duty d_c1 and may vary the first operation frequency f_c1. For example, as the load is decreased, the controller may increase the first operation frequency f_c1. In the first section, the first operation frequency f_c1 may be varied between a first frequency f1 and a third frequency f3 greater than the first frequency f1. In the first section, the first operation duty d_c1 may be fixed to a third duty d3.

In a second section p2 in which the load is less than the load is in the first section p1, the controller may fix the first operation frequency f_c1 and may vary the first operation duty d_c1. For example, as the load is decreased, the controller may decrease the first operation duty d_c1. In the second section, the first operation duty d_c1 may be varied between a third duty d3 and a first duty d1 less than the third duty d3. In the second section p2, the first operation frequency f_c1 may be fixed to the third frequency f3.

In a third section p3 in which the load is less than the second section p2, the controller may fix the first operation duty d_c1 and may vary the first operation frequency f_c1. For example, as the load is decreased, the controller may increase the first operation frequency f_c1. The first operation frequency f_c1 in the third section p3 may be varied between the third frequency f3 and a fourth frequency f4 greater than the third frequency f3. In the third section p3, the first operation duty d_c1 may be fixed to the first duty d1.

In a fourth section p4 in which the load is less than the third section p3, the controller may perform a phase control. As an example, the controller may control an inverter duty in the fourth section p4. The inverter duty may be defined as a ratio of a sum of a time in which both the first control signal and the fourth control signal are in an on state and a time in which both the second control signal and the third control signal are in the on state to a period T of the control signals. In other words, the inverter duty may be defined as a ratio of a time in which the power is supplied to the first resonator through the inverter to an operation period of the inverter of the first power transmitter. In the fourth section p4, as the load is decreased, the controller may decrease the inverter duty. The inverter duty may be adjusted by adjusting a switching timing. For example, the inverter duty may be adjusted by adjusting a phase difference between the first control signal (con1_11 in FIG. 2, con1_14 in FIG. 5, and con1_15 in FIG. 6) (and/or a second control signal (con1_21 in FIG. 2, con1_24 in FIG. 5, and con1_25 in FIG. 6)) and a third control signal (con1_31 in FIG. 2, con1_34 in FIG. 5, and con1_35 in FIG. 6) (and/or a fourth control signal (con1_41 in FIG. 2, con1_44 in FIG. 5, and con1_45 in FIG. 6)). In the fourth section p4, the first operation frequency f_c1 may be fixed to the fourth frequency f4, and the first operation duty d_c1 may be fixed to the first duty d1.

In a fifth section p5 and a sixth section p6 in which the load is less than the fourth section p4, the controller may control the inverter of the first power transmitter to operate as a half-bridge inverter. For example, the controller may control the inverter of the first power transmitter to operate as the half-bridge inverter by performing a control so that the third switching element (Q31 in FIG. 2, Q32 in FIG. 3, Q34 in FIG. 6, and Q35 in FIG. 7) is maintained in an off state, and the fourth switching element (Q41 in FIG. 2, Q42 in FIG. 3, Q44 in FIG. 6, and Q45 in FIG. 7) is maintained in an on state.

In the fifth section p5 in which the load is less than the fourth section p4, the controller may fix the first operation duty d_c1 and may vary the first operation frequency f_c1 while controlling the inverter of the first power transmitter to operate the half-bridge inverter. For example, as the load is decreased, the controller may increase the first operation frequency f_c1. In the fifth section p5, the first operation frequency f_c1 may be varied between the second frequency f2 and a fifth frequency f5 greater than the second frequency f2. In the first section, the first operation duty d_c1 may be fixed to a fourth duty d4.

In the sixth section p6 in which the load is less than the fifth section p5, the controller may fix the first operation frequency f_c1 and may vary the first operation duty d_c1 while controlling the inverter of the first power transmitter to operate the half-bridge inverter. For example, as the load is decreased, the controller may decrease the first operation duty d_c1. In the sixth section p6, the first operation duty d_c1 may be varied between the fourth duty d4 and the second duty d2 less than the fourth duty d4. In the second section, the first operation frequency f_c1 may be fixed to the fifth frequency f5.

Although FIG. 7 illustrates that the fifth frequency f5 is greater than the fourth frequency f4, the fifth frequency f5 may be equal to, or less than the fourth frequency f4. Similarly, although it is illustrated that the second frequency f2 is less than the third frequency f3 and is greater than the first frequency f1, the second frequency f2 may be equal to, or greater than the third frequency f3, and may be equal to, or less than the first frequency f1. In addition, although it is illustrated that the fourth duty d4 is greater than the third duty d3, the fourth duty d4 may be equal to, or less than the third duty d3. In addition, although it is illustrated that the second duty d2 is greater than the first duty d1, the second duty d2 may be equal to, or less than the first duty d1.

In FIG. 7, the third duty d3 may be a ping duty, which is a duty of a signal used to determine an existence of the wireless power receiver. In addition, a ping frequency, which is a frequency of the signal used to determine the existence of the wireless power receiver, may be equal to the first frequency f1, or may be a value between the first frequency f1 and the third frequency f3. In addition, the second frequency f2 may be a frequency which is equal to, or slightly greater than the ping frequency.

Figure 8:
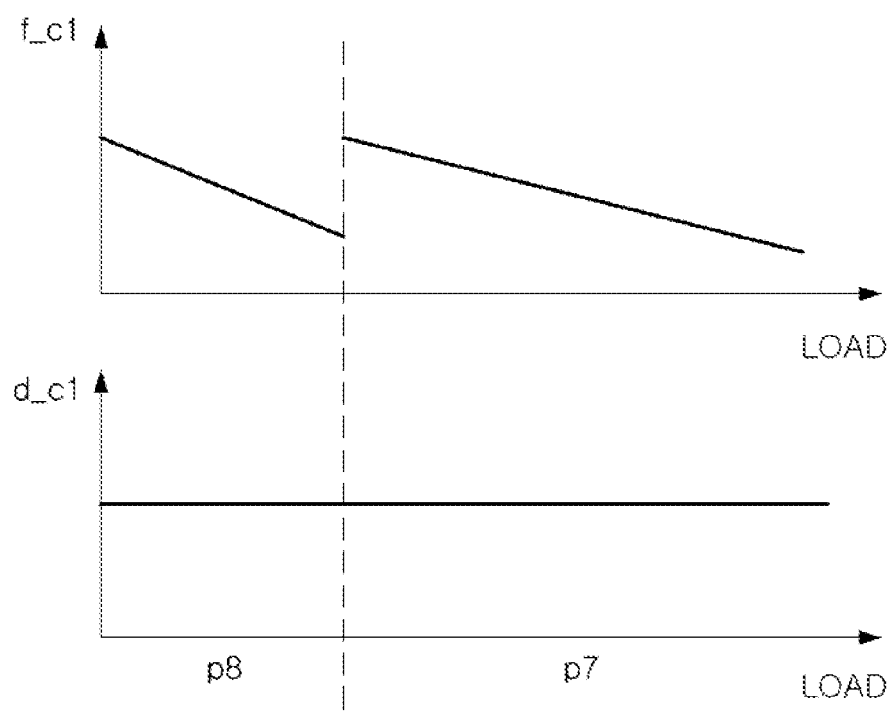

FIG. 8 is a diagram illustrating a method for controlling a first power transmitter of a wireless power transmitter, according to an embodiment. More specifically, FIG. 8 illustrates a control method of a case in which the first power transmitter transmits power to be supplied to a load (e.g., a battery) of a wireless power receiver. f_c1, d_c1, and a load of FIG. 8 are the same as those described in FIG. 7.

Referring to FIG. 8, the controller may fix the first operation duty d_c1 and may vary the first operation frequency f_c1. However, in a seventh section p7 in which the load is relatively large, the controller may control the inverter of the first power transmitter to operate as the full-bridge inverter, and in an eighth section p8 in which the load is relatively small, the controller may control the inverter of the first power transmitter to operate as the half-bridge inverter.

Figure 9:
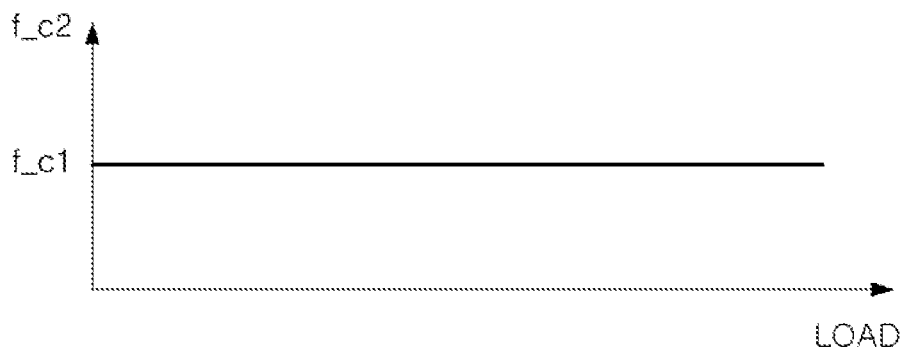
FIG. 9 is a diagram illustrating a method for controlling a second power transmitter of a wireless power transmitter, according to an embodiment.
Figure 9:
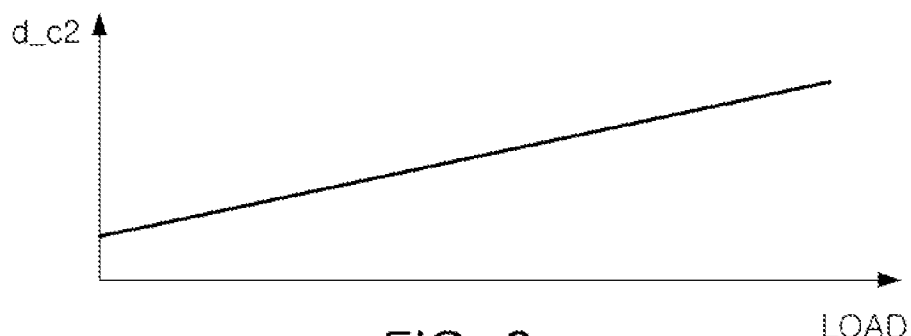

FIG. 9 is a diagram illustrating a method for controlling a second power transmitter of a wireless power transmitter, according to an embodiment. More specifically, FIG. 9 illustrates a control method of a case in which the second power transmitter transmits power to be supplied to a load (e.g., a battery) of a wireless power receiver.

In FIG. 9, f_c2 is a second operation frequency, which is a frequency of each of control signals controlling the switching elements configuring the second power transmitter (300 in FIG. 1, 301 in FIG. 2, 304 in FIGS. 3 through 5, and 305 in FIG. 6), d_c2 is a second operation duty, which is an ON duty of a control signal controlling a low side switching element (i.e., Q61 in FIG. 2, Q62 in FIG. 4, Q63 in FIG. 5, Q64 in FIG. 6, and Q64 in FIG. 7) among components of the second power transmitter, and a load is power required by the wireless power receiver or power to be output by the wireless power transmitter.

The controller may set the second operation frequency f_c2 to the first operation frequency f_c1, and may vary the second operation duty d_c2 according to the load. For example, as the load is decreased, the controller may decrease the second operation duty d_c2.

That is, according to an embodiment, the second operation frequency f_c2 may have the same value as the first operation frequency f_c1. Therefore, a hardware configuration of the controller may be further simplified.

The control method illustrated in FIGS. 7 through 9 may be performed by any of the controllers 400, 401, 404, and 405 of FIGS. 1, 2, 5, and 6.

Figure 10:
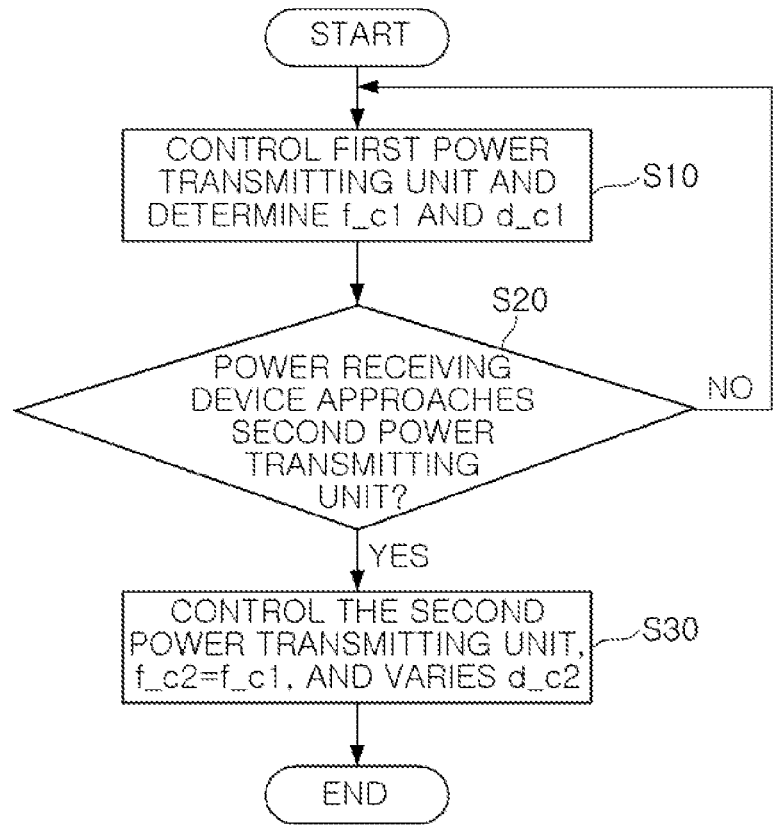
FIG. 10 is an operation flowchart illustrating a method for controlling a wireless power transmitter, according to an embodiment.

FIG. 10 is an operation flowchart illustrating a method for controlling a wireless power transmitter, according to an embodiment. The control method illustrated in FIG. 5 may be performed by the controller (400 in FIG. 1 or 401 in FIG. 2).

Referring to FIG. 10, in operation S10, if the controller senses that a first power receiving device approaches a first power transmitter, the controller may control the first power transmitter to transmit power from the first power transmitter to the power receiving device. The first power receiving device may be a device requiring a relatively large charging power, such as a smartphone, or the like.

In operation S10, a first operation frequency f_c1 and/or a first operation duty d_c1 may be determined. The first operation frequency f_c1 may be a frequency of each of the control signals controlling the switching elements constituting the first power transmitter (200 in FIG. 1, 201 in FIG. 2, 204 in FIG. 5, and 205 in FIG. 6). The first operation duty d_c1 may be an ON duty of a control signal controlling a low side switching element (i.e., Q21 in FIG. 2 and Q24 in FIG. 5) of a booster converter among the components of the first power transmitter.

The controller may determine the first operation frequency f_c1 and the first operation duty d_c1 based on error information, which is information on a difference between a magnitude of power required by the wireless power receiver and a magnitude of power received by the wireless power receiver.

A detailed description of operation S10 is provided below with reference to FIGS. 11 and 12.

Next, in operation S20, it may be determined whether a second power receiving device approaches a second power transmitter. In this case, a frequency (i.e., a second operation frequency f_c2) of each of the control signals applied to the second power transmitter (300 in FIG. 1, 301 in FIG. 2, 304 in FIGS. 3 through 5, and 305 in FIG. 6) may be the same as the first operation frequency f_c1 determined in operation S10. In operation S20, the controller may vary a second operation duty d_c2. The second operation duty d_c2 may be an ON duty of a control signal controlling a low side switching element (Q61 in FIG. 2, Q62 in FIG. 4, Q63 in FIG. 5, Q64 in FIG. 6, and Q65 in FIG. 7) of the second power transmitter.

Next, if it is determined in operation S20 that the second power receiving device approaches the second power transmitter, the controller may control the second power transmitter to supply power to the second power receiving device in operation S30. In operation S30, the second operation frequency f_c2 may be set in the same way as the first operation frequency f_c1 determined in operation S10, and only the second operation duty d_c2 may be varied.

The controller may generate and output the control signals according to the first operation frequency f_c1, the first operation duty d_c1, the second operation frequency f_c2, and the second operation duty d_c2 which are set according to the method described in FIG. 10.

Figure 11:
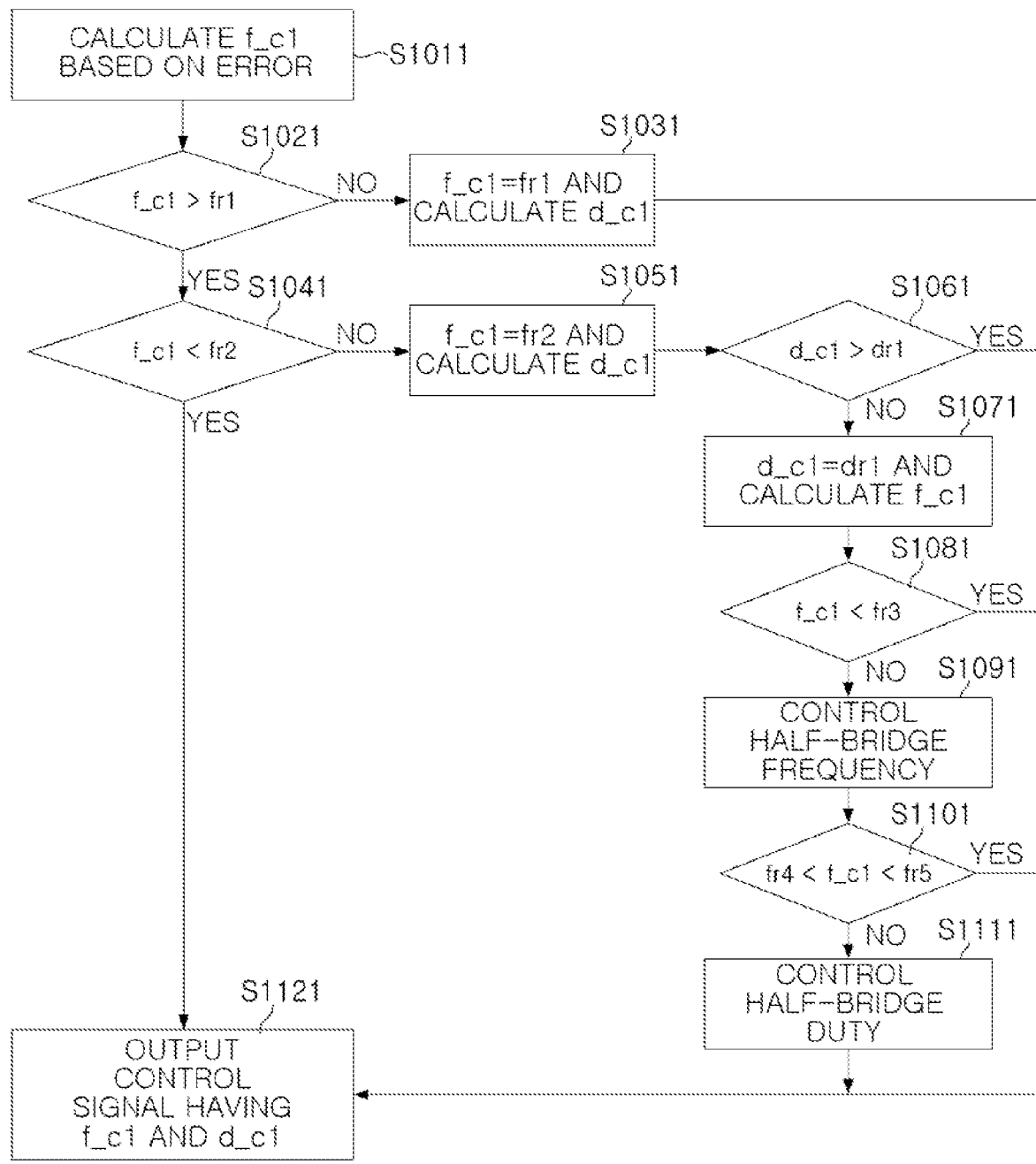
FIGS. 11 and 12 are operation flowcharts illustrating operations of controlling a first power transmitter of the method of FIG. 10, according to embodiments.

FIG. 11 is an operation flowchart illustrating an operation (e.g., operation S10 of FIG. 10) of controlling a first power transmitter of the method for controlling a wireless power transmitter, according to an embodiment. More specifically, FIG. 11 illustrates a control method of a case in which the first power transmitter transmits power to be supplied to a load (e.g., a battery) of a wireless power receiver.

Referring to FIG. 11, in operation S1011, the controller may calculate a first operation frequency f_c1 based on error information Error received from the wireless power receiver. In operation S1011, the controller may increase or decrease the first operation frequency f_c1 according to the error information Error. An initial value of the first operation frequency f_c1 may be ping frequency, which is a frequency of a signal used to detect whether the wireless power receiver exists, or the like. In addition, in operation S1011, a first operation duty d_c1 may be fixed. In operation S1011, the first operation duty d_c1 may be fixed to a ping duty, which is a duty of the signal used to detect whether the wireless power receiver exists, or the like. The error information Error may be information on a difference between a magnitude of power required by the wireless power receiver and a magnitude of power received by the wireless power receiver. Alternatively, the error information Error may be information representing whether the wireless power receiver requires power greater than or less than power received by the wireless power receiver.

Next, in operation S1021, the controller may determine whether the calculated first operation frequency f_c1 is greater than a first reference frequency fr1.

If it is determined in operation S1021 that the first operation frequency f_c1 is less than or equal to the first reference frequency fr1, the controller may set the first operation frequency f_c1 to the first reference frequency fr1 and calculate the first operation duty d_c1 based on the error information Error in operation S1031. Next, in operation S1121, the controller may generate and output first to fourth control signals according to the first operation frequency f_c1 and the first operation duty d_c1.

If it is determined in operation S1021 that the first operation frequency f_c1 is greater than the first reference frequency fr1, the controller may determine, in operation S1041, whether the first operation frequency f_c1 is less than a second reference frequency fr2.

If it is determined in operation S1041 that the first operation frequency f_c1 is less than the second reference frequency fr2, the controller may generate and output the first to fourth control signals according to the first operation frequency f_c1 and the first operation duty d_c1, in operation S1121.

If it is determined in operation S1041 that the first operation frequency f_c1 is greater than or equal to the second reference frequency fr2, the controller, in operation S1051, may set the first operation frequency f_c1 to the second reference frequency fr2, and calculate the first operation duty d_c1 based on the error information Error.

Next, in operation S1061, the controller may determine whether first operation duty d_c1 is greater than a first reference duty dr1.

If it is determined in operation S1061 that the first operation duty d_c1 is greater than the first reference duty dr1, the controller may generate and output the first to fourth control signals according to the first operation frequency f_c1 and the first operation duty d_c1, in operation S1121.

If it is determined in operation S1061 that the first operation duty d_c1 is less than or equal to the first reference duty dr1, the controller, in operation S1071, may set the first operation duty d_c1 to the first reference duty dr1, and calculate the first operation frequency f_c1 based on the error information Error.

Next, in operation S1081, the controller may determine whether or not the first operation frequency f_c1 is less than a third reference frequency fr3.

If it is determined in operation S1081 that the first operation frequency f_c1 is less than the third reference frequency fr3, the controller may generate and output the first to fourth control signals according to the first operation frequency f_c1 and the first operation duty d_c1, in operation S1121.

If it is determined in operation S1081 that the first operation frequency f_c1 is greater than or equal to the third reference frequency fr3, the controller, in operation S1091, may set a duty of each of the first to fourth control signals so that the inverter of the first power transmitter operates as a half-bridge inverter, and may then calculate the first operation frequency f_c1 based on the error information Error.

Next, in operation S1101, the controller may determine whether the first operation frequency f_c1 is a value between a fourth reference frequency fr4 and fifth reference frequency fr5.

If it is determined in operation S1101 that the first operation frequency f_c1 is the value between the fourth reference frequency fr4 and the fifth reference frequency fr5, the controller may generate and output the first to fourth control signals according to the first operation frequency f_c1 and the first operation duty d_c1, in operation S1121.

If it is determined in operation S1011 that the first operation frequency f_c1 is not the value between the fourth reference frequency fr4 and the fifth reference frequency fr5, the controller, in operation S1111, may set the first operation frequency f_c1 to the fourth reference frequency fr4 or the fifth reference frequency fr5, and calculate the first operation duty d_c1 based on an error signal Error. Next, in operation S1121, the controller may generate and output first to fourth control signals according to the first operation frequency f_c1 and the first operation duty d_c1.

Figure 12:
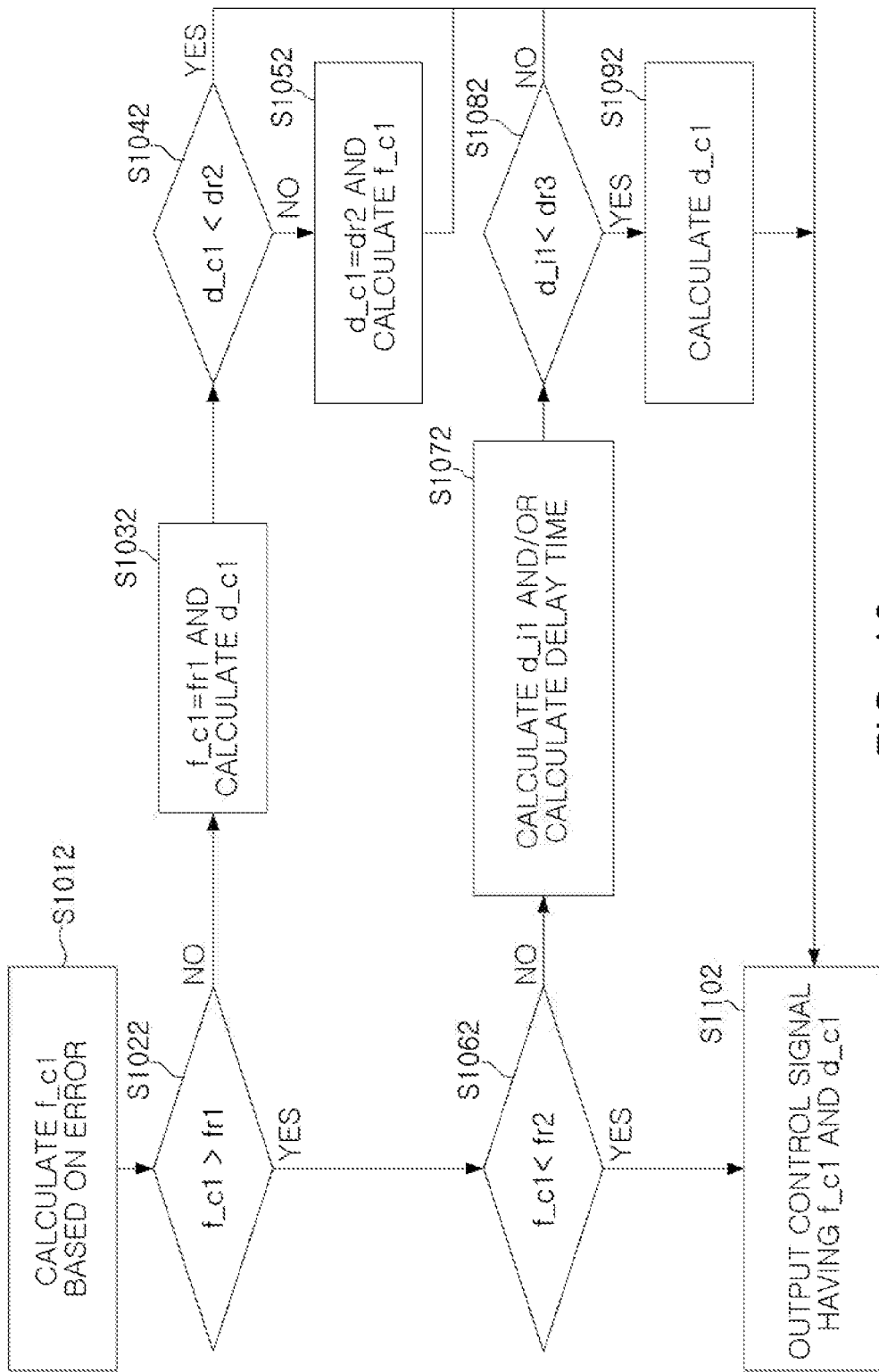

FIG. 12 is an operation flowchart illustrating an operation (e.g., operation S10 of FIG. 10) of controlling a first power transmitter of the method for controlling a wireless power transmitter, according to an embodiment. More specifically, FIG. 12 illustrates a control method of a case in which the first power transmitter transmits power to be supplied to a load (e.g., a battery) of a wireless power receiver.

First, in operation S1012, the controller may calculate a first operation frequency f_c1 based on error information Error received from the wireless power receiver. In this case, a first operation duty d_c1 may be fixed.

Next, in operation S1022, the controller may determine whether the first operation frequency f_c1 is greater than a first reference frequency fr1.

If it is determined in operation S1022 that the first operation frequency f_c1 is less than or equal to the first reference frequency fr1, the controller, in operation S1032, may set the first operation frequency f_c1 to the first reference frequency fr1, and calculate the first operation duty d_c1 based on the error information Error.

Next, in operation S1042, the controller may determine whether the first operation duty d_c1 is less than a second reference duty dr2.

If it is determined in operation S1042 that the first operation duty d_c1 is less than the second reference duty dr2, the controller may generate and output the first to fourth control signals according to the first operation frequency f_c1 and the first operation duty d_c1, in operation S1102.

If it is determined in operation S1042 that the first operation duty d_c1 is greater than or equal to the second reference duty dr2, the controller, in operation S1052, may set the first operation duty d_c1 to the second reference duty dr2, and calculate the first operation frequency f_c1 based on the error information Error. Next, the controller may generate and output first to fourth control signals according to the first operation frequency f_c1 and the first operation duty d_c1, in operation S1102.

If it is determined in operation S1022 that the first operation frequency f_c1 is greater than the first reference frequency fr1, the controller may determine whether the first operation frequency f_c1 is less than a second reference frequency fr2, in operation S1062.

If it is determined in operation S1062 that the first operation frequency f_c1 is less than the second reference frequency fr2, the controller may generate and output the first to fourth control signals according to the first operation frequency f_c1 and the first operation duty d_c1, in operation S1102.

If it is determined in operation S1062 that the first operation frequency f_c1 is greater than or equal to the second reference frequency fr2, the controller, in operation S1072, may set the first operation frequency f_c1 to the second reference frequency fr2, and calculate an inverter duty d_i1 and/or a delay time based on an error signal Error. The delay time may be a delay time of each of the control signals controlling the third switching element (Q31 in FIG. 2, Q32 in FIG. 3, Q34 in FIG. 6, and Q35 in FIG. 7) and the fourth switching element (Q41 in FIG. 2, Q42 in FIG. 3, Q44 in FIG. 6, and Q45 in FIG. 7).

Next, in operation S1082, the controller may determine whether the calculated inverter duty d_i1 is less than a reference inverter duty dr3.

If it is determined in operation S1082 that the inverter duty d_i1 calculated in operation S1072 is greater than or equal to the reference inverter duty dr3, the controller, in operation S1102, may generate the control signals using the inverter duty d_i1 calculated in operation S1072 and the first set operation frequency f_c1 and the first set operation duty d_c1, and may output the generated control signals. The first operation duty d_c1 may be the same as a duty of a signal used to determine whether the wireless power receiver exists, and the first set operation frequency f_c1 may be the same as the second reference frequency fr2.

If it is determined in operation S1082 that the inverter duty d_i1 calculated in operation S1072 is less than the reference inverter duty dr3, the controller may again calculate the first operation duty d_c1 based on the error signal Error, in operation S1092. In operation S1092, the inverter duty d_i1 may be fixed to the reference inverter duty dr3, and the first operation frequency may be fixed to the second reference frequency fr2.

Next, in operation S1102, the controller may generate the control signals using the first calculated operation duty d_c1, the set inverter duty d_i1, and the first set operation frequency f_c1, and may output the generated control signals.

Each of the operations of FIGS. 11 and 12 may also be omitted in some cases. In addition, each of the operations of FIGS. 11 and 12 may be variously re-combined and used in some cases. For example, after S1092 of FIG. 12, operations similar to operations S1081 to S1111 of FIG. 11 for operating the first power transmitter in a half-bridge mode may also be additionally performed. Alternatively, after S1081 of FIG. 11 is performed and before operation S1091 of FIG. 11 is performed, operations S1072 to S1092 of FIG. 12 may also be additionally performed to perform a phase difference control for the first power transmitter.

As set forth above, according to the embodiments disclosed herein, a wireless power transmitter may more efficiently transmit power to various mobile devices having different required charging powers. In addition, the wireless power transmitter, according to an embodiment, may efficiently transmit the power even though it operates in a small frequency range. Further, the wireless power transmitter may simultaneously transmit the power to the mobile devices having different charging powers, and a cost for manufacturing the wireless power transmitter may also be reduced.

The controller 400 of FIG. 1, the controller 401 of FIG. 2, the controller 404 of FIG. 5, and the controller 405 of FIG. 6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 7-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter, comprising:
a power supply configured to supply a driving power;
a first power transmitter comprising first bridge switching elements forming a first bridge circuit, and configured to receive the driving power to transmit a first power, wherein a first magnitude of a first input voltage applied to the first bridge circuit is determined by a duty of at least one first bridge switching element among the first bridge switching elements;
a second power transmitter comprising second bridge switching elements forming a second bridge circuit, and configured to receive the driving power to transmit a second power, wherein a second magnitude of a second input voltage applied to the second bridge circuit is determined by a duty of at least one second bridge switching element among the second bridge switching elements; and
a controller configured to output first power transmitting control signals controlling the first bridge switching elements and second power transmitting control signals controlling the second bridge switching elements,
wherein a first resonance capacitor and a first resonance inductor are connected in series with each other between a first node and a third node, and
wherein the first power transmitter further comprises a first capacitor connected between a ground and a second node between two switching elements, among the first bridge switching elements,
wherein the first bridge switching elements included in the first power transmitter include a first set of two switching elements, the first set of two switching elements including a first switching element connected between the second node and the first node and a second switching element connected between the second node and the third node, and
wherein the first bridge switching elements further comprise a second set of two switching elements, the second set of two switching elements including a third switching element connected between the first node and the ground and a fourth switching element connected between the third node and the ground,
wherein the first power transmitter further comprises a first inductor connected between a node to which the driving power is applied and the first node,
wherein the first inductor, the first capacitor, the first switching element and the third switching element operate as a boost converter that steps-up the driving power to a voltage of the second node, and
wherein the first switching element, the second switching element, the third switching element, and the fourth switching element operate as a full-bridge inverter that converts the voltage of the second node into an AC power to be supplied to the first resonant capacitor and the first resonant inductor.

2. The wireless power transmitter of claim 1, wherein the first bridge circuit is a full-bridge circuit, and the second bridge circuit is a half-bridge circuit.

3. The wireless power transmitter of claim 1, wherein the controller comprises an integrated circuit.

4. The wireless power transmitter of claim 1, wherein frequencies of the first power transmitting control signals are the same as frequencies of the second power transmitting control signals.

5. The wireless power transmitter of claim 4, wherein the controller is configured to determine the frequencies of the first power transmitting control signals based on first error information, and determine the frequencies of the second power transmitting control signals according to the frequencies of the first power transmitting control signals.

6. A wireless power transmitter, comprising:
a power supply configured to supply a driving power;

a first power transmitter comprising first bridge switching elements forming a first bridge circuit, and configured to receive the driving power to transmit a first power, wherein a magnitude of a first input voltage applied to the first bridge circuit is determined by a duty of at least one first bridge switching element among the first bridge switching elements;

a second power transmitter comprising second bridge switching elements forming a second bridge circuit, and configured to receive the first input voltage to transmit a second power; and a controller configured to output first power transmitting control signals controlling the first bridge switching elements and second power transmitting control signals controlling the second bridge switching elements, wherein a first resonance capacitor and a first resonance inductor are connected in series with each other between a first node and a third node, and wherein the first power transmitter further comprises a first capacitor connected between a ground and a second node between two switching elements, among the first bridge switching elements, wherein the first bridge switching elements included in the first power transmitter comprise a first set of two switching elements, the first set of two switching elements comprising a first switching element connected between the second node and the first node and a second switching element connected between the second node and the third node, wherein the first bridge switching elements further comprise a second set of two switching elements, the second set of two switching elements comprising a third switching element connected between the first node and the ground and a fourth switching element connected between the third node and the ground, wherein the first power transmitter further comprises a first inductor connected between a node to which the driving power is applied and the first node, wherein the first inductor, the first capacitor, the first switching element and the third switching element operate as a boost converter that steps-up the driving power to a voltage of the second node, and wherein the first switching element, the second switching element, the third switching element, and the fourth switching element operate as a full-bridge inverter that converts the voltage of the second node into an AC power to be supplied to the first resonant capacitor and the first resonant inductor.

7. The wireless power transmitter of claim 6, wherein the first bridge circuit is a full-bridge circuit, and the second bridge circuit is a half-bridge circuit.

8. The wireless power transmitter of claim 6, wherein frequencies of the first power transmitting control signals are the same as frequencies of the second power transmitting control signals.

9. A wireless power transmitter, comprising:
a power supply configured to supply a driving power;
a first power transmitter comprising first bridge switching elements forming a first bridge circuit, and configured to receive the driving power to wirelessly transmit a first power;
a second power transmitter comprising second bridge switching elements forming a second bridge circuit, and configured to receive the driving power to wirelessly transmit a second power; and
a controller configured to determine a first operation frequency and a first operation duty based on first error information, generate and output first power transmitting control signals controlling the first bridge switching elements, based on the first operation frequency and the first operation duty, determine a second operation duty based on second error information and determine a second operation frequency based on the first operation frequency, and generate and output second power transmitting control signals controlling the second bridge switching elements, based on the second operation frequency and the second operation duty, wherein a first magnitude of a first input voltage input to the first bridge circuit is determined by the first operation duty, wherein a first resonance capacitor and a first resonance inductor are connected in series with each other between a first node and a third node, and wherein the first power transmitter further comprises a first capacitor connected between a ground and a second node between two switching elements, among the first bridge switching elements, wherein the first bridge switching elements included in the first power transmitter comprise a first set of two switching elements, the first set of two switching elements comprising a first switching element connected between the second node and the first node and a second switching element connected between the second node and the third node, wherein the first bridge switching elements further comprise a second set of two switching elements, the second set of two switching elements comprising a third switching element connected between the first node and the ground and a fourth switching element connected between the third node and the ground, wherein the first power transmitter further comprises a first inductor connected between a node to which the driving power is applied and the first node, wherein the first inductor, the first capacitor, the first switching element and the third switching element operate as a boost converter that steps-up the driving power to a voltage of the second node, and wherein the first switching element, the second switching element, the third switching element, and the fourth switching element operate as a full-bridge inverter that converts the voltage of the second node into an AC power to be supplied to the first resonant capacitor and the first resonant inductor.

10. The wireless power transmitter of claim 9, wherein the first bridge circuit is a full-bridge circuit, and the second bridge circuit is a half-bridge circuit.

11. The wireless power transmitter of claim 10, wherein the controller is configured to output the first power transmitting control signals to cause the first bridge circuit to operate as a full-bridge inverter, in response to a power required by a first wireless power receiver receiving the power from the first power transmitter being higher than reference power, and the controller is configured to output the first power transmitting control signals to cause the first bridge circuit to operate as a half-bridge inverter, in response to the power required by the first wireless power receiver being lower than the reference power.

12. The wireless power transmitter of claim 10, wherein the controller is configured to set the first operation duty to a reference duty having a first fixed value and vary the first operation frequency based on the first error information, in response to a power required by a first wireless power receiver receiving the power from the first power transmitter being higher than reference power, and the controller is configured to set the first operation frequency as a reference frequency having a second fixed value and vary the first operation duty based on the first error information, in response to the power for the first wireless power receiver being lower than the reference power.

13. The wireless power transmitter of claim 10, wherein the controller is configured to vary either one or both of the first operation frequency and the first operation duty based on the first error information, in response to a power required by a first wireless power receiver receiving the power from the first power transmitter being higher than reference power, and the controller is configured to vary an inverter duty of the first bridge circuit based on the first error information, in response to the power required by the first wireless power receiver being lower than the reference power.

14. The wireless power transmitter of claim 9, wherein a second magnitude of a second input voltage input to the second bridge circuit is determined by the second operation duty.

15. The wireless power transmitter of claim 9, wherein the first input voltage is input to the second bridge circuit.

* * * * *